Aug. 2, 1949.                      C. M. RICE                        2,477,769
              WASTE WATER DISPOSAL AND FRESH WATER LOADING
                       SYSTEM FOR TRAILERS AND THE LIKE
Filed March 26, 1945                                            2 Sheets-Sheet 2
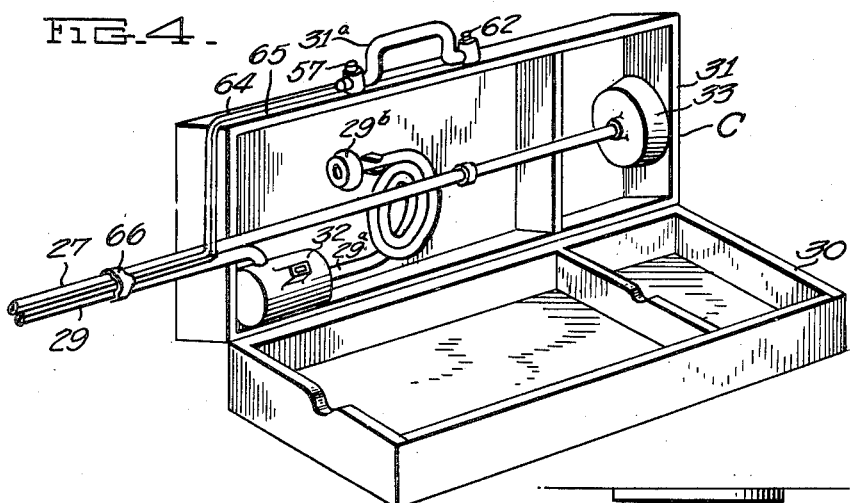
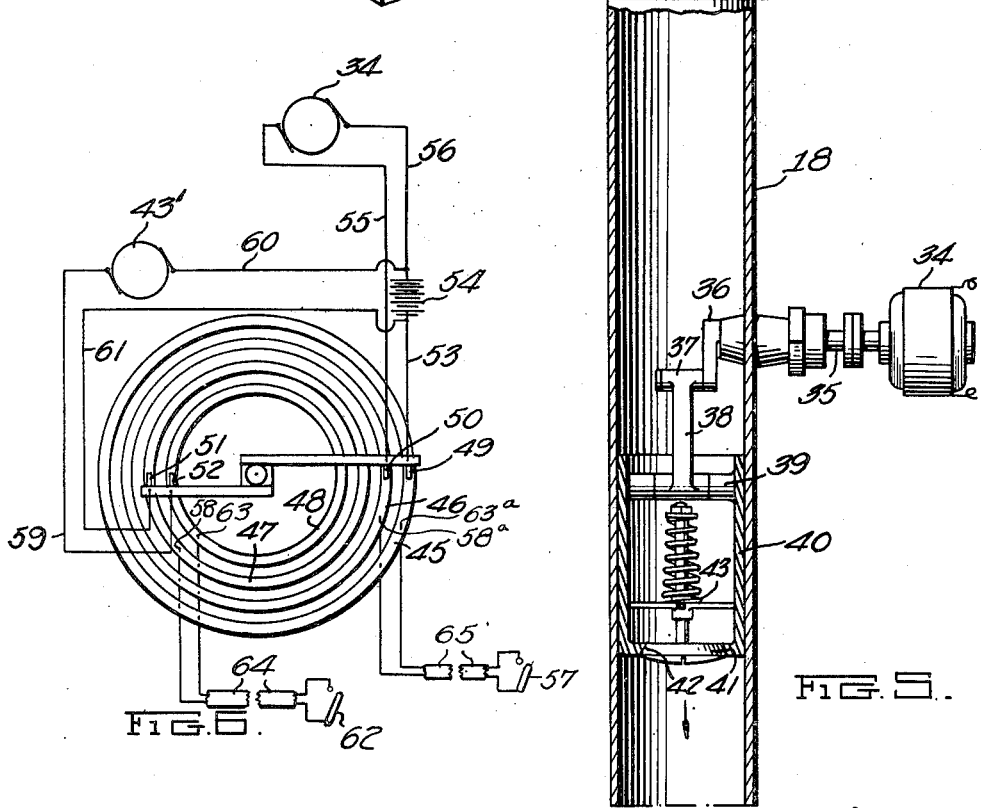
Inventor
CLIFFORD M. RICE
By George E. Cook.
Attorney Patented Aug. 2, 1949

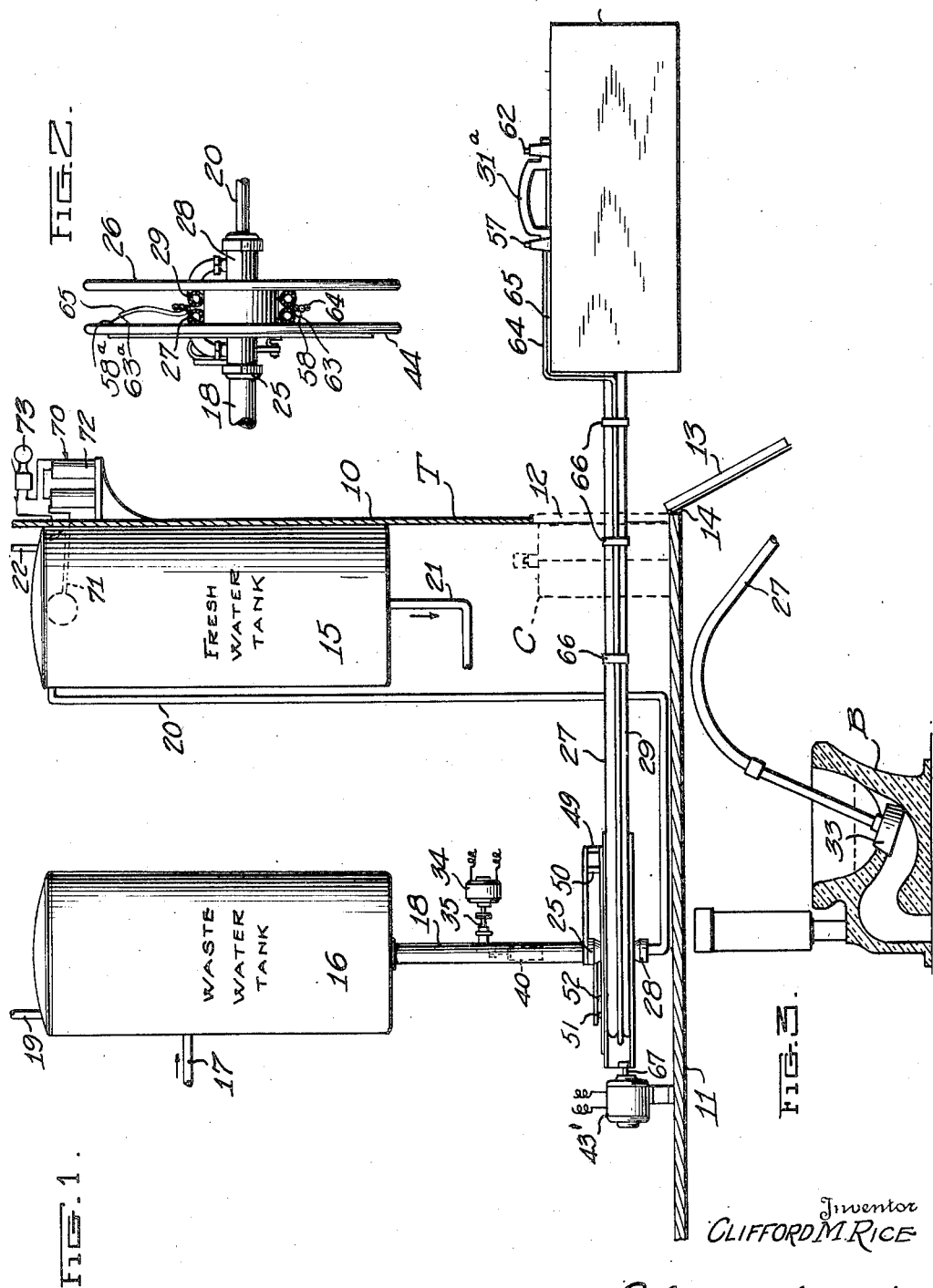

2,477,769

UNITED STATES PATENT OFFICE 2,477,769

WASTE WATER DISPOSAL AND FRESH WATER LOADING SYSTEM FOR TRAILERS AND THE LIKE

Clifford M. Rice, Alexandria, Va.

Application March 26, 1945, Serial No. 584,970

6 Claims. (Cl. 182—1)

The instant invention relates to a fresh water loading and waste water disposal system for house trailers, mobile residences, busses and the like.

One of the primary objects of the invention is the construction of a fresh water loading and waste water disposal unit for trailers, busses and similar vehicles which may be readily connected to sources of fresh water and waste water disposal, such as the plumbing system of a gasoline filling station or other available water supply.

Yet another aim is the incorporation of a fresh water loading and waste water disposal unit in a mobile residence, bus or trailer embodying a reel and portable case, the reel having wound thereon a pair of flexible hoses leading to a fresh water tank and a waste water tank, respectively, the terminal portions of the hoses being contained within said case for connection, respectively, to a source of fresh water such as a spigot or hydrant, and a waste water outlet such as a toilet bowl.

Yet another purpose is the construction of a fresh water supply and waste water disposal system which is composed of relatively few parts and which embodies electrical means associated with a portable case for ready operation of the waste water unloading and fresh water loading of the system.

The above and other aims and objects will be apparent from the detailed description hereinafter appearing when taken in conjunction with the appended drawings forming a part hereof to which attention is now directed and in which Fig. 1 is a diagrammatic view, partly in elevation, showing fresh water and waste water tanks in a portion of a mobile residence, trailer or the like, as well as a hose-carrying reel and associated portable case and electrical means operatively connected with the tanks and reel.

Fig. 2 is a front elevational view of the reel.

Fig. 3 is a side elevational view, partly in section, showing the waste disposal terminal of a hose in operative position within a toilet bowl.

Fig. 4 is a perspective view of the portable case and showing the manner in which the waste disposal terminal portion of a hose and the water loading terminal of a second hose may be disposed therein.

Fig. 5 is a vertical sectional view, partly in elevation, showing the pump mounted in the outlet pipe of the water waste tank; and Fig. 6 is a wiring diagram of the motor which serves to rotate the reel to wind the hose thereon and the motor which operates the pump in the waste water tank, all wired to the reel, portable case and a battery.

In recent years house trailers and mobile residences have become very popular and are to be found in increasing numbers on the highways and in so-called trailer camps or parks. One of the outstanding problems attendant in the use of such mobile residences, trailers and the like is an efficient system for disposal of waste water from and the loading of fresh water on the trailer for use in the plumbing system thereof. The instant invention is directed to an efficient unit to be used at a gasoline filling station or any other place where a sewer outlet and a fresh water spigot are available. This will be apparent from the following detailed description.

Referring now to the drawings, the reference character T designates a portion of a mobile residence, trailer or the like having a side wall 10 and a bottom wall or floor 11. The wall 10 has an opening 12 therein adapted to be closed by a door 13 hinged as at 14 to the floor 11. A fresh water tank 15 and a waste water tank 16 are disposed within the trailer T and as shown the waste water tank 16 has a waste water inlet pipe 17, an outlet pipe 18 leading from the bottom thereof and a vent 19 adapted to pass through the roof of the trailer. Similarly, the fresh water tank 15 has an inlet pipe 20 connected adjacent the top thereof, an outlet pipe 21, and a vent 22 similar to the vent 19. It will be understood that the pipe 17 is connected to the waste water portion of the plumbing system of the trailer, while the pipe 21 leads to the water supply of the trailer and is connected to its spigots, shower, toilet and the like. Outlet pipe 18 terminates in a rotary coupling 25 fastened to one side of a hose reel 26. A flexible hose 27 is operatively connected to the coupling 25 whereby waste water from the pipe 18 will flow through rotary coupling 25 and into hose 27 in any position of the reel 26. In like manner, water inlet pipe 20 terminates in a rotary coupling 28 fastened to the other side of the hose reel 26, the coupling 28 being connected to a second flexible hose 29 whereby fresh water from the hose 29 will flow through the rotary coupling 28 to the pipe 20 and into the fresh water tank 19 in any position of the reel 26.

Turning now to Fig. 1, it will be noted that an elongated portable case C is shown in dotted lines resting on the floor 11 of the trailer adjacent the opening 12, the latter being adapted to be closed by hinged door 13 as previously described. The terminal portions of hoses 27 and 29 are positioned within portable case C as will be best seen by reference to Fig. 4 of the drawings. The case C comprises a base portion 30 and a hinged lid 31 having a carrying handle 31ᵃ. Lid 31 has a water meter 32 mounted fixedly therein to one end of which flexible hose 29 is coupled. A flexible hose portion 29ᵃ having an enlarged inlet head 29ᵇ is coupled to the inlet end of water meter 32. It will now be understood that upon removal of hose section 29ᵃ and attachment of head 29ᵇ to a water spigot, water will flow through hose section 29ᵃ, meter 32, hose 29, pipe 20 into the fresh water tank, as will be pointed out in more detail hereinafter. Flexible hose 27 terminates in an enlarged plunger-like cup or head 33.

Attention is now directed to Figs. 1 and 5, and particularly to the latter showing the pump mechanism mounted within the waste water outlet pipe 18. This mechanism comprises an electrical motor 34 which drives a motor shaft 35 passing through the wall of the pipe 18, said shaft 35 having a crank 36 fixedly secured thereto. Pivotally secured to the crank 36 as at 37 is an arm 38, the other end of the arm 38 being pivotally attached to the wrist pin 39 of a pump piston 40. The latter has a bottom wall or head 41 apertured as at 42, said aperture being closed by a spring valve 43. When the motor 34 is energized, the crank 36 is rotated serving to raise the pump piston 40 and the spring valve is then opened permitting waste water to flow through aperture 42. Upon downward movement of the pump piston 40 the valve 43 closes the aperture 42 and water is forced from the pipe 18 in the direction of the arrow of Fig. 5. It will now be understood that upon operation of the pump water will flow through pipe 18, hose 27, terminal head 33, the latter being shown in Fig. 3 as positioned within a waste disposal opening of a toilet bowl B.

In the use of the device the door 12 is opened and the portable case C is removed, the trailer, of course, having been driven to a place adjacent a spigot and toilet of a filling station or the like. The case C is grasped by an attendant or operator of the trailer and pulled outwardly, or to the right viewing Fig. 1. The flexible hoses 27 and 29 which are rolled on the reel are now unwound and the terminal portions of the hoses 27 and 29 are adapted to be connected to a waste disposal opening of a toilet and a water spigot, respectively. Electrical means is provided from points on the case C to operate the pump motor 34 and a motor 43′ which serves to wind up the reel after completion of the waste disposal and water loading operations. The electrical system whereby this is accomplished will now be described:

One side face 44 of the reel 26 has a plurality of concentric current-carrying rings 45, 46, 47 and 48 secured thereto. The rings are in spaced relation to one another and mounted on a bed of insulation as will be understood. Furthermore, the rings will be free to rotate with the reel. Fixed brushes 49 and 50 are in electrical contact with rings 45 and 46 and similarly fixed brushes 51 and 52 are in electrical contact with inner rings 47 and 48. Brush 49 is connected by a wire 53 to one terminal of a battery 54. The brush 50 is connected by a wire 55 to pump motor 34 while a wire 56 leads from motor 34 to the other terminal of the battery 54.

Similarly, brush 52 is connected by a wire 59 to the motor 43′, a wire 60 leading from the motor for connection to wire 56. Brush 51 is connected by wire 61 to wire 53. The brushes are insulated from one another and the rings 45 and 46 are electrically insulated from each other and in like manner rings 47 and 48 are electrically insulated from each other.

The switches 57 and 62 are positioned on the cover 31 of the case C as will be seen by reference to Figs. 1 and 4, and attached to said switches 57 and 62 are cables 65 and 64, respectively, each cable containing two wires. Cables 64 and 65 are mounted on the outer portion of the case C and are attached to the hoses 27 and 29 by spaced clips 66 and are adapted to wind and unwind with the two hoses. The terminals of the two wires in cable 64 are fastened to terminal posts 58 and 63, respectively, said posts being integral with the contact rings 47 and 48 and extending through openings in the side face 44 of reel 26. In similar manner the terminals of the two wires in cable 65 are secured to the contact rings 45 and 46 by terminal posts 58ᵃ and 63ᵃ. Thus it will be seen that the closing of switch 57 will close the electrical circuit of wires 53 and 55 by way of contact brushes 49 and 50 and through contact rings 45 and 46, to which the two wires of cable 65 are fastened, this circuit being opened or closed at will with the reel in any position. The closing of switch 62 will in like manner close the electrical circuit of wires 59 and 61 by way of contact brushes 51 and 52 and through contact rings 47 and 48 to which the two wires of cable 64 are fastened, this circuit being also opened or closed at will with the reel in any position, contact being maintained while the reel is rotating which is necessary for the operation of rewind motor 43′. Motor 43′ has a rotary shaft 67 terminating in a gear 68 operatively connected to the geared inner surface of the reel 26.

The operation of the device is as follows: The door 13 having been opened, the portable case C is grasped, the hoses and cables unwound by pulling the case C outwardly to a position adjacent a toilet and spigot of the rest room of a filling station or the like. The case is now opened, the head 33 of the hose 27 is removed and is positioned within the waste disposal opening in the bowl B of the toilet as shown in Fig. 3 of the drawing. The switch 57 is now closed. This starts the motor 34 which operates the pump piston 40 in the waste pump 18 of the waste water tank 16 and the waste water is accordingly removed from the waste water tank. When this operation is completed the switch 57 is opened. The head 33 of the hose 27 is now removed from the toilet bowl B and the head 29ᵇ of the hoses 29—29ᵃ is attached to a water spigot. Water now flows through hose 29ᵃ, meter 32, hose 29, pipe 20 into fresh water tank 15. Each of these operations can be performed separately or simultaneously, as desired. For indicating when the fresh water tank 15 is full, a float operated alarm, 70 embodying a water float 71, batteries 72, and a bell 73 is provided. Upon completion of the filling of the fresh water tank, the head 29ᵇ is disconnected from the spigot and the head 33 of the hose 27 and hose 29ᵃ and head 29ᵇ replaced within the case C which is then closed. A switch 62 on the case C is now closed which starts motor 43′ to rotate the reel 26 to wind the hoses 27 and 29 and cables 64 and 65 on the reel until the case C is now in a position to be placed within the trailer T after which the door 13 is locked. The water meter 32 is an indication of the amount of water used in loading the fresh water tank and is useful where a charge is made for this water supply.

From the above it will be apparent that there has been provided a waste water disposal and fresh water loading system for mobile residences, trailers and the like well adapted to efficiently perform its intended functions. Various changes may be made in the specific details shown and it is contemplated to cover all such and to be limited in this respect only as may be necessary by the scope of the claims hereto appended.

What I claim and desire to secure by Letters Patent is:

1. A waste water disposal and fresh water loading system for trailers, mobile residences, busses and the like comprising a waste water tank and a fresh water tank, a reel, a pair of flexible hoses carried by said reel, separate means connecting the waste water tank and the fresh water tank to each one of said hoses, and means for selectively emptying the waste water tank and filling the fresh water tank through said hoses.

2. A waste water disposal and fresh water loading system for trailers, mobile residences, busses and the like comprising a waste water tank and a fresh water tank, a reel, a pair of flexible hoses carried by said reel, separate means connecting the waste water tank and the fresh water tank to each one of said hoses, a portable case receiving the ends of said hoses, and means for selectively emptying the waste water tank and filling the fresh water tank through said hose ends upon removal of same from said case.

3. A waste water disposal and fresh water loading system for trailers, mobile residences, busses and the like comprising a waste water tank and a fresh water tank, a reel, a pair of flexible hoses carried by said reel, separate means connecting the waste water tank and the fresh water tank to each one of said hoses, a portable case receiving the ends of said hoses, a motor-operated pump for emptying said waste water tank intermediate said water tank and its hose, and means carried by said case and reel for actuating the motor of said pump to empty said tank through one of said hose ends.

4. The structure of claim 3, and additional means for rotating the reel to wind said hoses thereon.

5. A waste water disposal and fresh water loading system for trailers, mobile residences, busses and the like comprising a waste water tank and a fresh water tank, a reel, a pair of flexible hoses carried by said reel, separate means connecting the waste water tank and the fresh water tank to each one of said hoses, an electrical system comprising a motor-operated pump for emptying said waste water tank through one of said hose ends and a separate motor for rotating said reel to wind the hoses thereon, a battery connected to said motors, and switch means carried by a portable case to selectively complete the circuit from the battery through said motors.

6. A waste water disposal and fresh water loading system for trailers, mobile residences, busses and the like comprising a waste water tank and a fresh water tank therein, a waste pipe leading from said waste water tank, a motor-operated pump in said pipe for emptying the waste water from said tank, a rotatable reel, a flexible hose on said reel connected to said waste water pipe, a second flexible hose on said reel connected to said fresh water tank, a portable case receiving the ends of said hoses, said case being movable outwardly of the trailer, a motor in the trailer for rotating said reel, a battery for the motor of said pump and said reel motor, an electrical cable carried by said reel connected to said motors and battery, said hose ends being selectively connectible to a waste water outlet and a fresh water source, said electrical cable having switch means carried by said case, said switch means being selectively operable to actuate either said pump motor or said reel motor.

CLIFFORD M. RICE.

REFERENCES CITED

The following references are of record in the file of this patent:

UNITED STATES PATENTS

| Number | Name | Date |
|---|---|---|
| 1,115,325 | McCall | Oct. 27, 1914 |
| 1,155,550 | Clarke | Oct. 5, 1915 |
| 1,392,955 | Martin | Oct. 11, 1921 |
| 1,607,899 | Long | Nov. 23, 1926 |
| 1,613,849 | Riegel | Jan. 11, 1927 |
| 2,315,085 | Churchward | Mar. 30, 1943 |